United States Patent
Armstrong et al.

(10) Patent No.: US 7,631,922 B2
(45) Date of Patent: Dec. 15, 2009

(54) TAILGATE DAMPENING APPARATUS

(75) Inventors: Rodney A. Armstrong, Belmont, NC (US); James T. Kull, Denver, NC (US); Robert D. Wagner, Charlotte, NC (US)

(73) Assignee: Stabilus, Inc., Gastonia, NC (US)

( * ) Notice: Subject to any disclaimer, the term of this patent is extended or adjusted under 35 U.S.C. 154(b) by 387 days.

(21) Appl. No.: 11/510,434

(22) Filed: Aug. 25, 2006

(65) Prior Publication Data
US 2008/0252093 A1   Oct. 16, 2008

(51) Int. Cl.
*B62D 33/03* (2006.01)
(52) U.S. Cl. .................................. 296/57.1; 296/50
(58) Field of Classification Search .................. 296/50, 296/57.1
See application file for complete search history.

(56) References Cited
U.S. PATENT DOCUMENTS

| 5,810,339 A | 9/1998 | Kuspert et al. |
| 6,217,097 B1 | 4/2001 | Rogers, Jr. et al. |
| 6,279,979 B1 | 8/2001 | Cauley |
| 6,357,813 B1 | 3/2002 | Vanderberghe et al. |
| 6,773,047 B2 | 8/2004 | Gruber |
| 6,832,801 B2 | 12/2004 | Zagoroff |
| 2002/0168539 A1 * | 11/2002 | Jonte et al. .................. 428/633 |
| 2006/0102440 A1 * | 5/2006 | Nygren et al. .............. 188/314 |
| 2008/0277960 A1 * | 11/2008 | Zagoroff ..................... 296/57.1 |

* cited by examiner

*Primary Examiner*—Lori L Lyjak
(74) *Attorney, Agent, or Firm*—Baker Botts L.L.P.

(57) ABSTRACT

An apparatus for damping the motion of a tailgate attached to a truck bed comprising a damper having a truck bed attachment point at one end and a tailgate attachment point at the other end. The truck bed attachment point is secured to said truck bed, while the tailgate attachment point is secured to the tailgate.

33 Claims, 17 Drawing Sheets

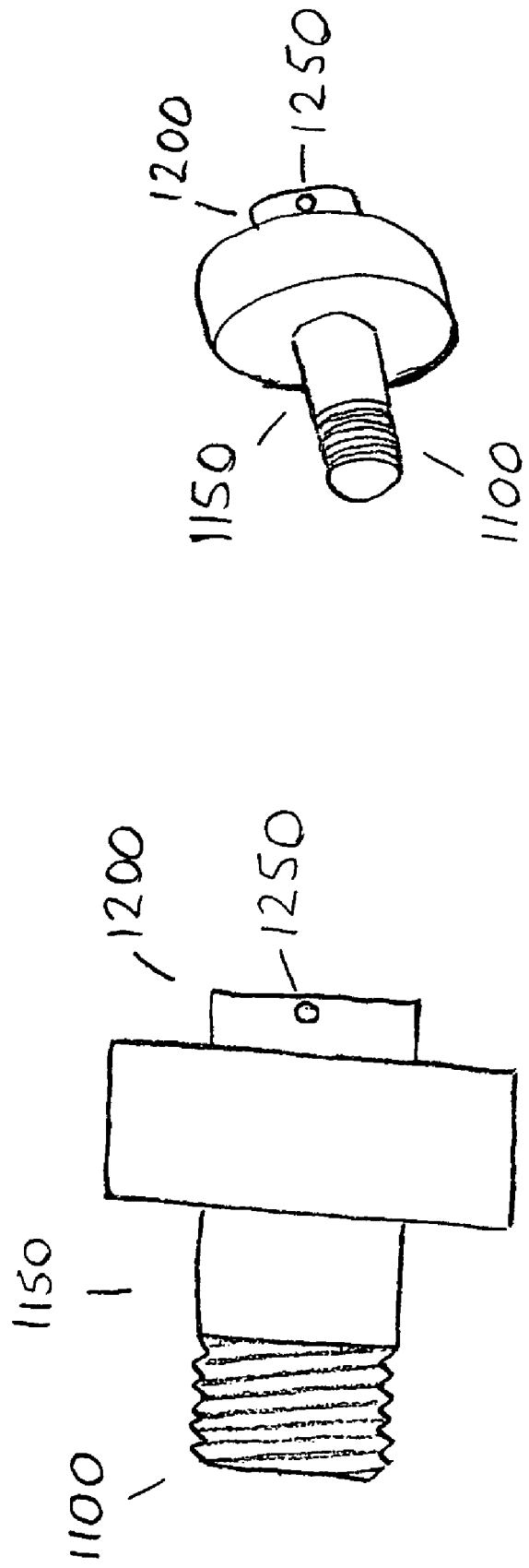

US 7,631,922 B2

TAILGATE DAMPENING APPARATUS

TECHNICAL FIELD OF THE INVENTION

The present invention relates generally to tailgates and, particularly, to devices that are used to control the movement of truck tailgates. More specifically, the invention relates to a tailgate dampening system.

BACKGROUND OF THE INVENTION

When a user opens the tailgate of a truck, the tailgate will normally come crashing down. The movement of the tailgate is restrained only by the user's ability to hold up the tailgate. Truck and other types of tailgates can be heavy and often times users may not be strong enough to handle the weight of the tailgate or their hands may be otherwise occupied. The unrestrained movement of these tailgates can cause injuries, and can also, if repeated over time, cause structural damage to the tailgate assembly.

In the past, installing either internal torsion bars or coil springs has been suggested as a possible fix. This additional equipment must be installed at the manufacturer, however, or it will be an obtrusive and unsightly addition to the truck. Gas springs have also been suggested, however, a typical gas spring would have to be installed in a position outside the tailgate of the truck in order to counteract the weight of the tailgate. If installed internally to the truck bed, a gas spring would tend to force the tailgate open, increasing instead of decreasing the force that must be counteracted by the user.

Stabilus, Inc.'s "Lift-O-Mat," which was installed on the 1996 Chevrolet Trailblazers utilizes a gas spring in conjunction with a ball and socket installation. However, the performance is not optimal at least because the gas spring necessarily has both an extension and compression force. This means that a force is being applied to the tailgate both when the tailgate is being opened and when it is being closed. The gas spring, therefore, inversely affects the closing action of the tailgate and makes it more difficult to close the tailgate. Additionally, the gas spring does not allow for a quick-disconnect feature and must be manufactured for specific truck models.

There is a need for a compact tailgate dampening apparatus that may be easily installed and removed aftermarket. There is a need for a tailgate dampening system that will not increase the force necessary to close the tailgate. There is also a need for a tailgate dampening system that will not interfere with the structural integrity or safety systems of the tailgate assembly.

SUMMARY OF THE INVENTION

An object of the present invention is to provide a tailgate dampening apparatus that may be easily installed and removed aftermarket. Another object is to provide a tailgate dampening system that will act to control the movement of a tailgate during opening but will not increase the force necessary to close the tailgate. Another object is to provide a tailgate dampening system that will not interfere with the structural integrity or safety systems of the tailgate assembly.

The objects referred to above are attained, in accordance with the present invention, by the installation of a tailgate dampening apparatus. One end of a one-way piston damper is attached to the side of the truck bed, while the other end is attached to the tailgate. Once installed, the damper fits between the tailgate and the bed of the truck, and does not interfere with pre-existing safety cables or attachments.

In one embodiment of the present invention, the damper controls the tailgate motion when the tailgate is opened. The damper further controls the movement of the tailgate when it moves from its closed vertical position to a fully-open and horizontal position. The tailgate, with the dampening apparatus installed, opens smoothly and slowly rather than crashing down.

The damper restrains the motion of the tailgate when opened, but provides no resistance to the user when the tailgate is being closed. The damper may also be constructed with a stacked washer piston assembly that maintains a constant dampening force despite increases in speed, resulting in a digressive performance curve.

DESCRIPTION OF THE DRAWINGS

For a more complete understanding of the present invention, and the advantages thereof, reference may be made to the following description of exemplary embodiments, taken in conjunction with the accompanying drawings, in which:

FIG. 16 and FIG. 16A are side and isometric views, respectively, of the tailgate bolt of an alternate embodiment of the present invention used to attach the bracket to the truck's tailgate.

FIG. 17 and FIG. 17A are side and isometric views, respectively, of the bracket stud of an alternate embodiment of the present invention used to attach the tailgate attachment of the damper to the bracket.

DESCRIPTION OF THE EMBODIMENTS

Figure 1:
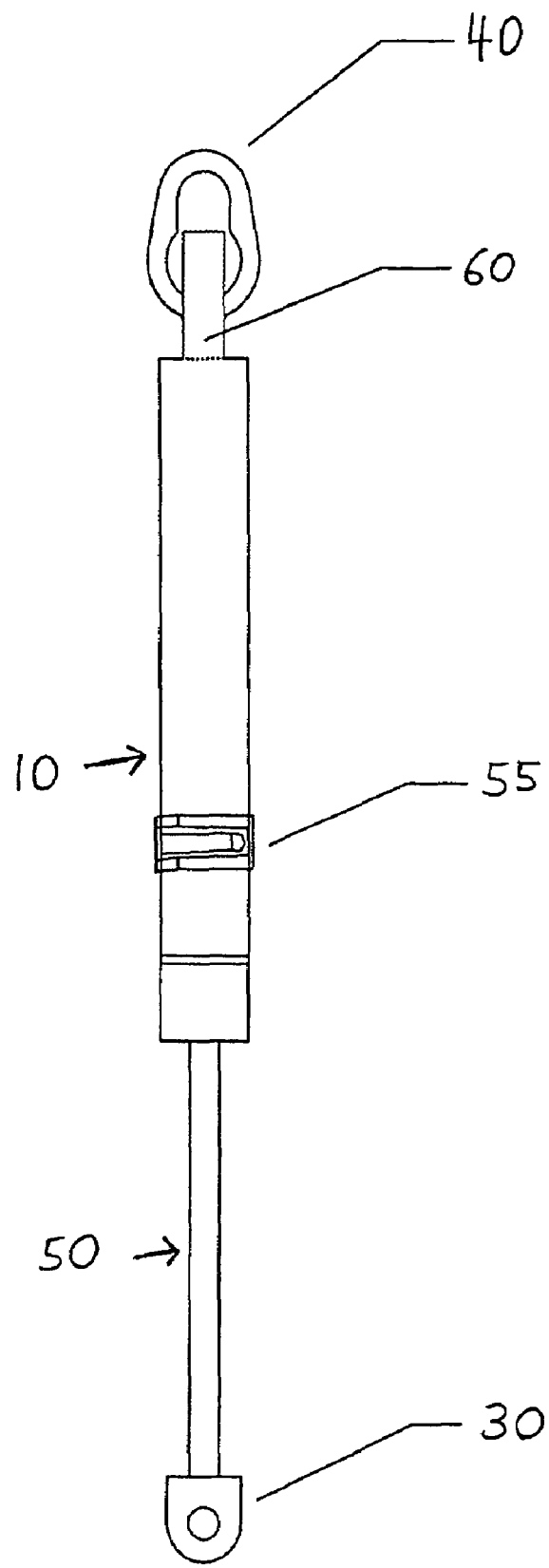
FIG. 1 is a side view of one embodiment of the present invention prior to installation.
Figure 4:
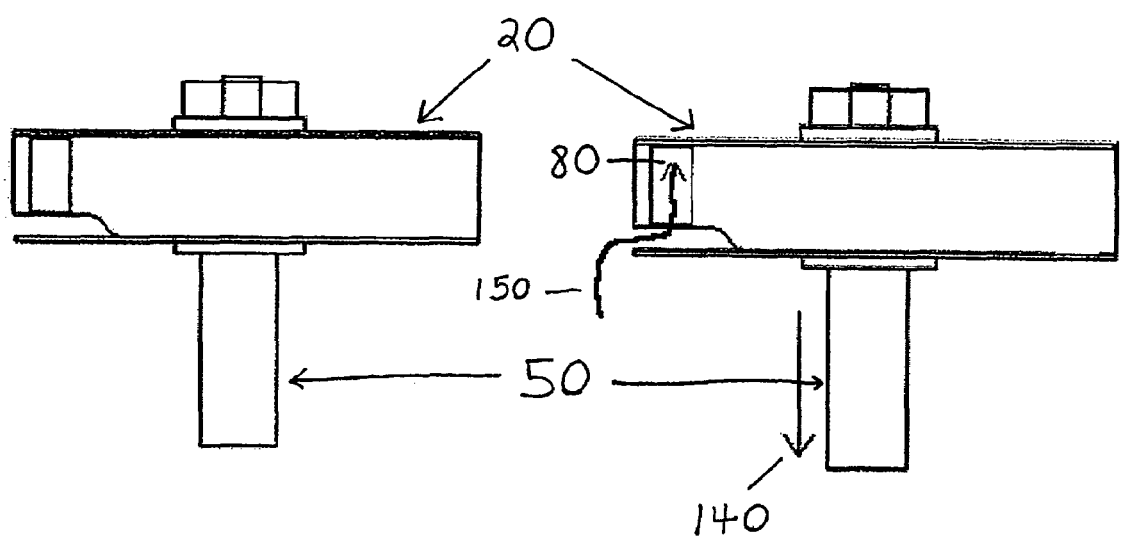
FIG. 4 is a side view of one embodiment of the piston assembly of the present invention during opening of the tailgate.
Figure 5:
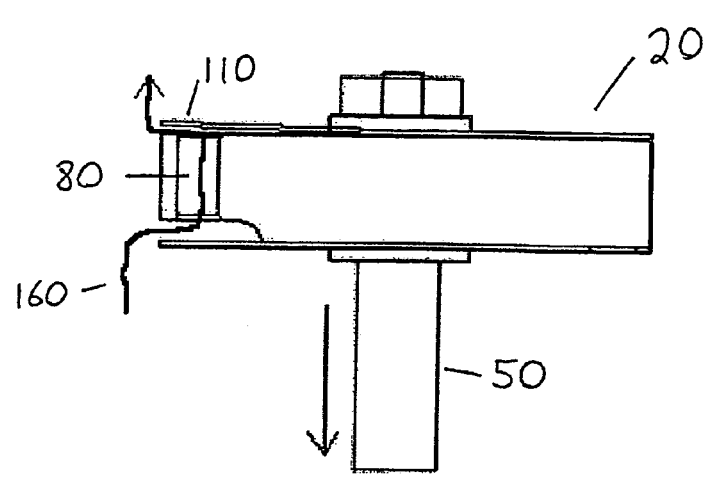
FIG. 5 is a side view of one embodiment of the present invention with excessive oil flow through the piston assembly as a result of increased force exerted to open the tailgate.

FIG. 1 shows an embodiment of a tailgate dampening apparatus of the present invention prior to installation. A tubular housing 10 for a piston assembly 20, is shown in FIGS. 4 and 5. Piston assembly 20 acts to control the extension, but not compression, speed of a rod 50 with respect to the tubular housing 10. In one embodiment, piston assembly 20 includes stacked washers. Rod 50 is attached to tailgate attachment 30, while tubular housing 10 is attached to bed attachment 40. Bed attachment 40 is a quick-release fitting, which allows easy installation of the apparatus. Tubular housing 10 may optionally include retention clip 60, which acts to prevent the quick-release fitting of bed attachment 40 from disengaging. Tubular housing 10 may also optionally include an adjustable retention clip 55, which acts to prevent the vehicle's existing tailgate safety cable from interfering with the operation of the tailgate or incurring damage due to the installation and operation of the invention.

Figure 2:
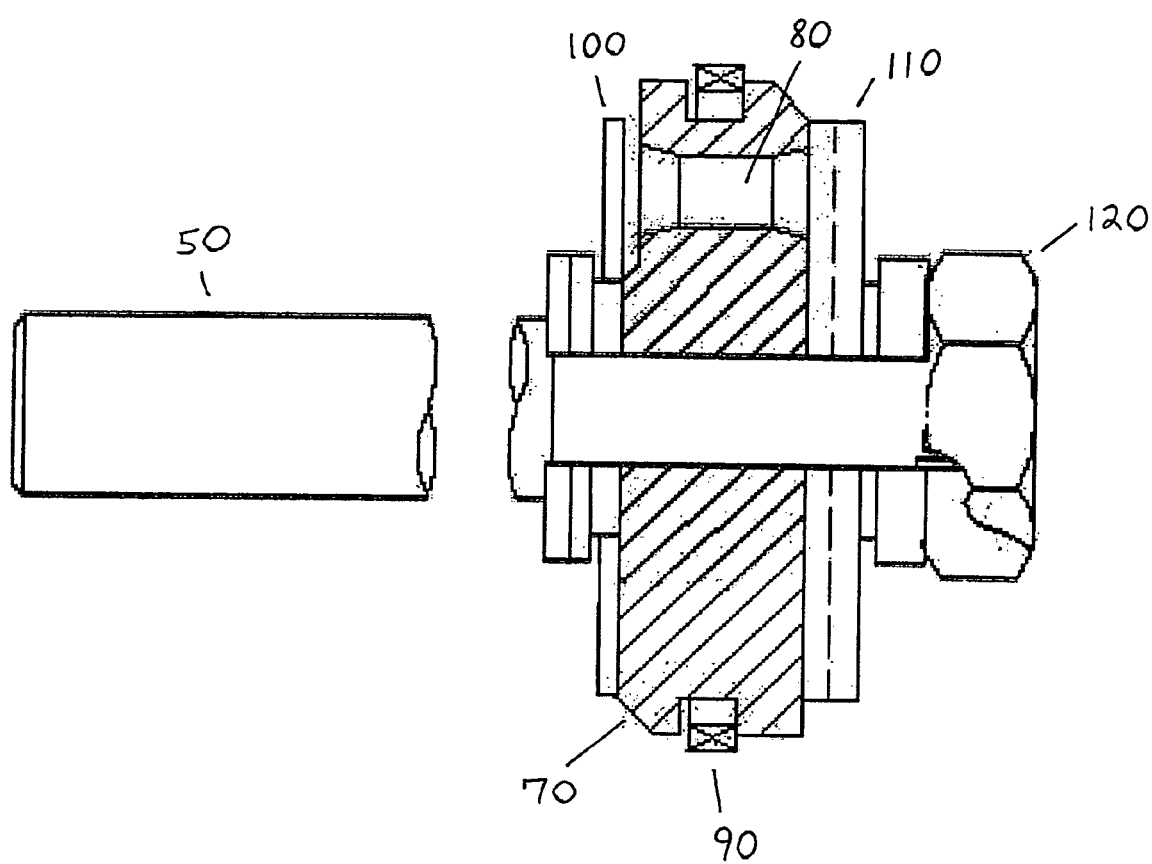
FIG. 2 is a side cross-sectional view of one embodiment of the stacked washer piston assembly of the present invention.

FIG. 2 shows a cross-sectional view of an embodiment of a stacked washer piston head of the present invention. The stacked washer piston head includes a piston head 70 containing a bypass groove 80 that allows hydraulic oil to pass from one side of piston head 70 to the other, a sealing ring element 90, which may be plastic or rubber. The sealing ring element 90 acts to seal the piston to the inside of the tubular housing 10. Two metallic washers 100 and 110 on either side of piston head 70 act to strengthen the assembly and also interact with sealing element 90 to control the speed of the tailgate. Piston head 70 is mounted on a bolt 120, which is attached to rod 50.

Figure 3:
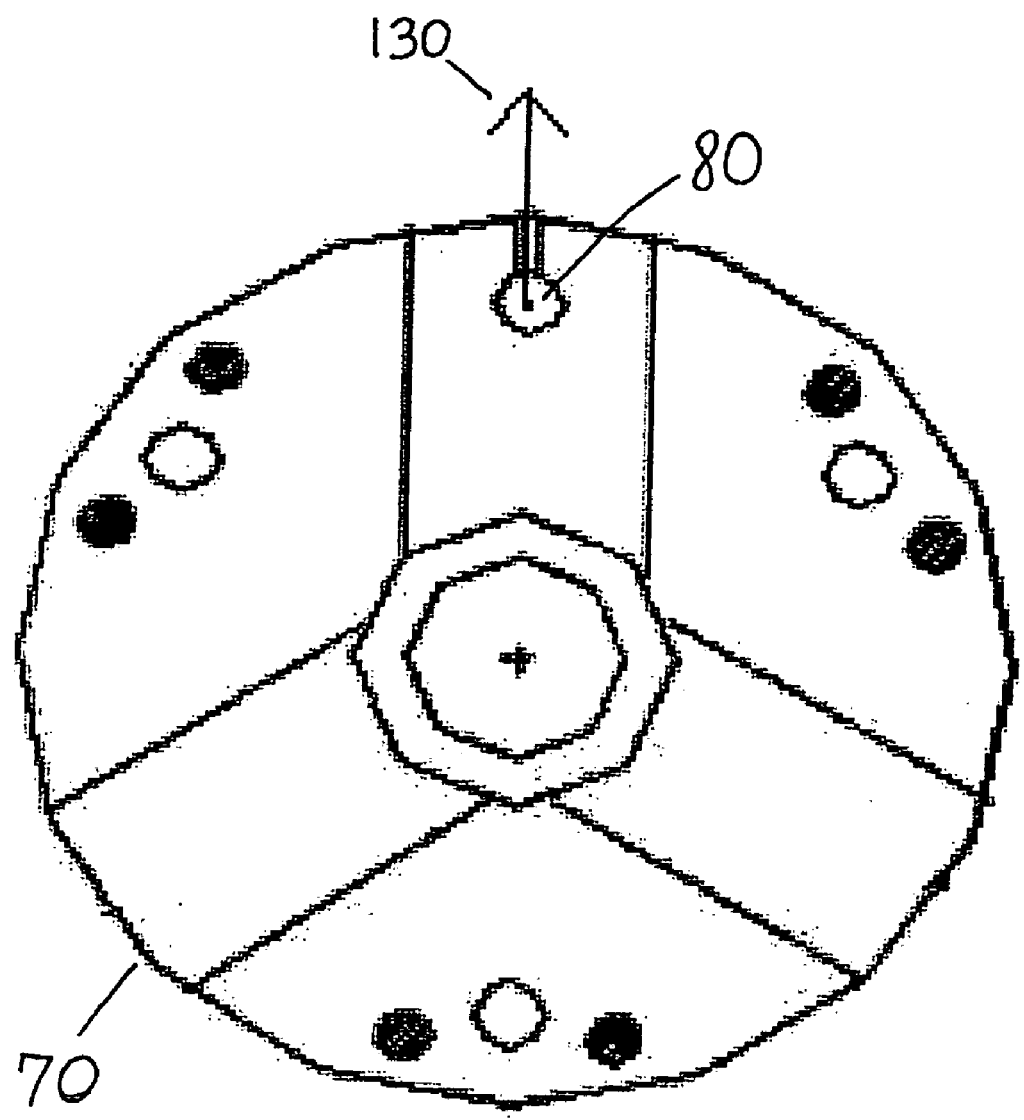
FIG. 3 is a top view of one embodiment of the piston located in the damper of the present invention.

FIG. 3 shows a top-down view of piston head 70, including bypass groove 80. The flow of oil through bypass groove 80 is indicated by arrow 130.

As shown in FIG. 4, when a force is applied to rod 50 to extend it, such as during the opening of the tailgate, rod 50 and stacked washer piston assembly 20 slide in the direction of arrow 140. As the piston assembly 20 moves, hydraulic oil flows into bypass groove 80 and through the assembly to the other side, as indicated by arrow 150. The speed of the extension of the rod 50 is controlled by the flow of the hydraulic oil through bypass groove 80. If rod 50 is compressed instead of extended, such as during the closing of the tailgate, very little, if any, damping force will be exerted, thus avoiding increasing the difficulty of closing the truck tailgate.

Figure 5A:
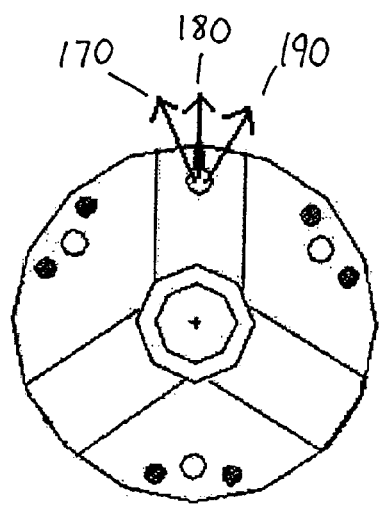
FIG. 5A is a top view of one embodiment of the present invention with excessive oil flow through the piston assembly as a result of increased force exerted to open the tailgate.

As shown in FIGS. 5 and 5A, if excessive force is applied to extend rod 50, excessive hydraulic pressure is created on washer 110, which sits on top of piston assembly 20 and partially covers bypass groove 80. This excessive hydraulic pressure causes washer 110 to deflect, increasing the bypass area and allowing additional oil to flow through bypass groove 80, as indicated by arrows 160, 170, 180, and 190. As a result, the amount of output damping force is stabilized.

Figure 6:
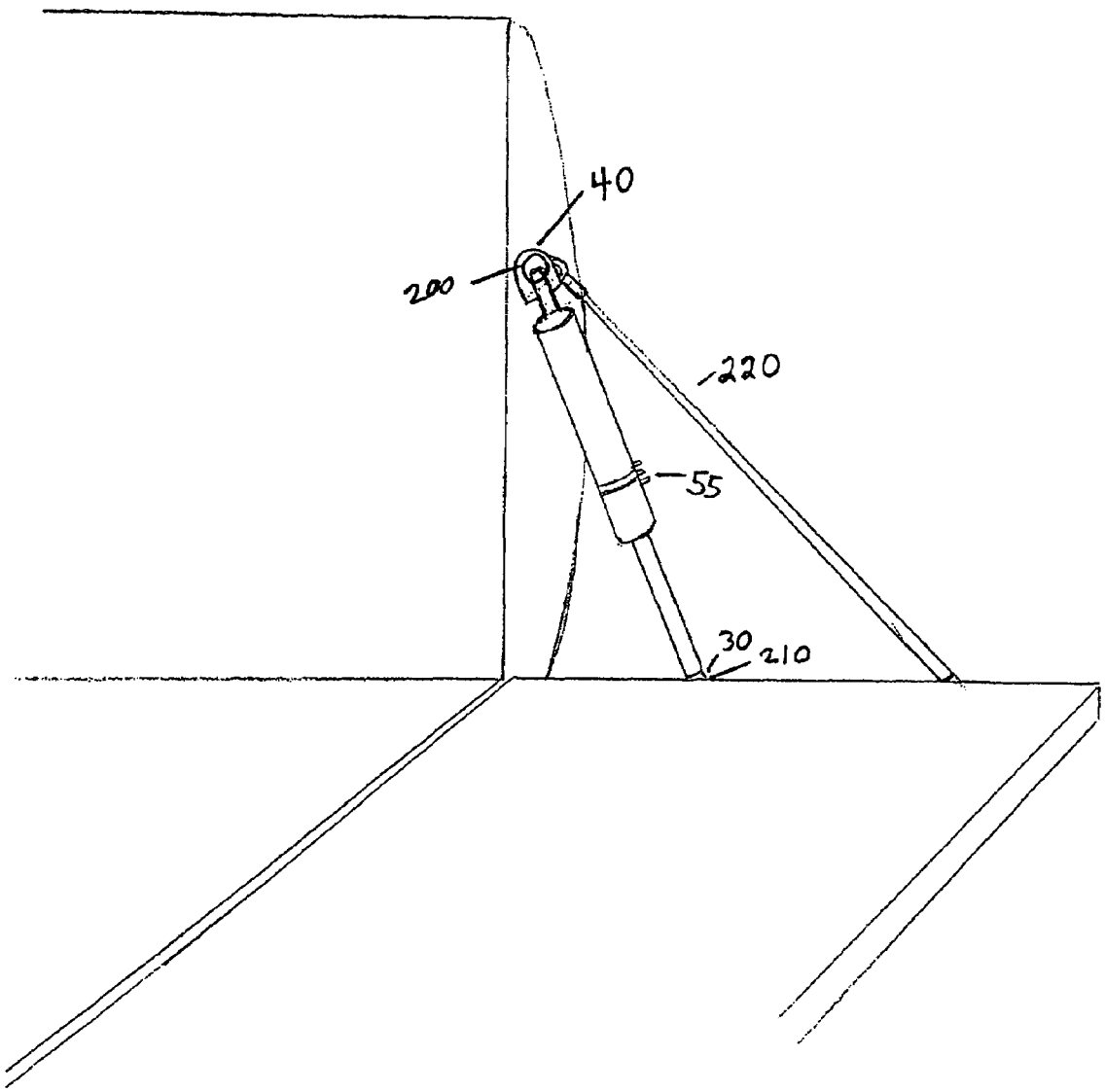
FIG. 6 is a side view of the installed tailgate dampening system of the present invention in a fully-open position.
Figure 7:
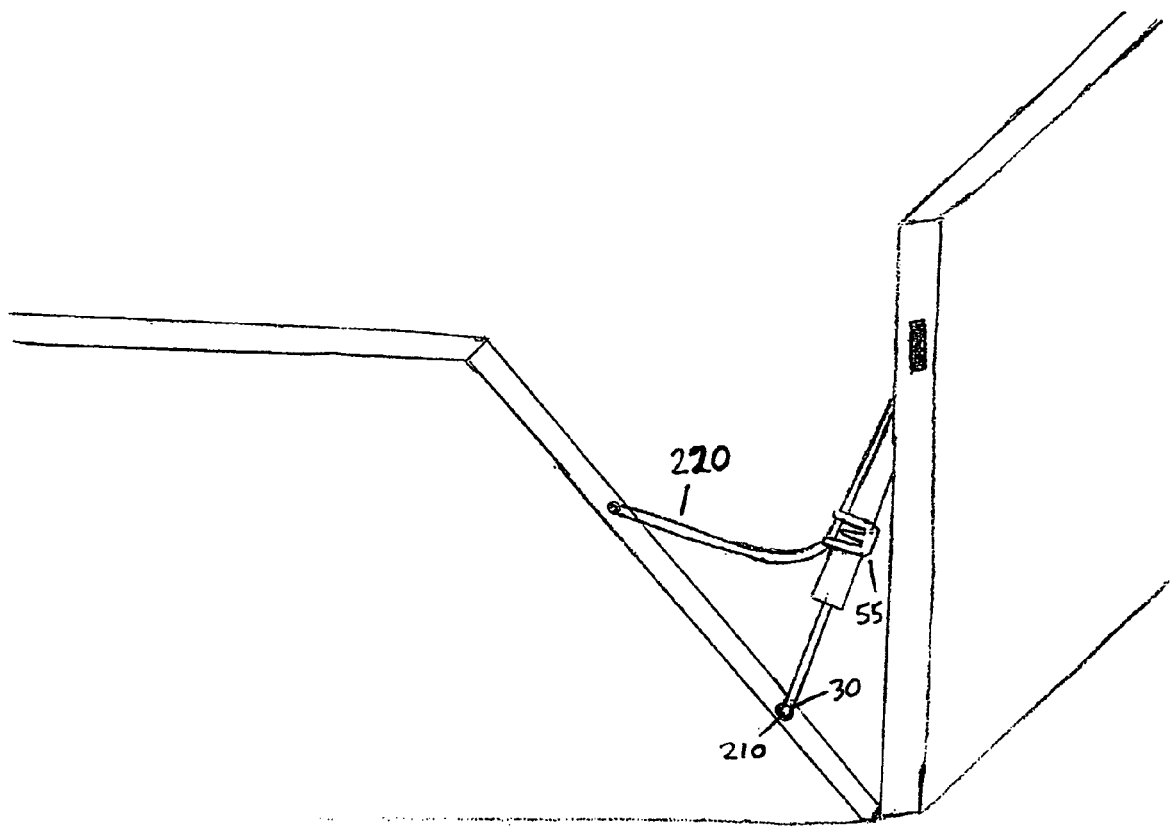
FIG. 7 is a side view of the installed tailgate dampening system of the present invention in a partially-open position.

As shown in FIGS. 6 & 7, in one embodiment bed attachment 40 is attached to the existing safety cable attachment point 200 in the truck bed. Tailgate attachment 30 is attached to the tailgate attachment point 210 on the tailgate of the truck. The truck bed attachment point 200 is a pre-existing hole in the truck bed. The tailgate attachment point 210 is a pre-existing hole in the tailgate.

Installation and operation of the invention does not interfere with the existing safety cable 220 or the structural integrity of the tailgate itself. Adjustable retention clip 55, meanwhile, acts to ensure safety cable 220 is not caught in the tailgate during operation and interfere or get damaged, by catching the safety cable and thereby guiding the movement of safety cable 220 during closing of the tailgate so safety cable 220 falls into the proper position.

Figure 8:
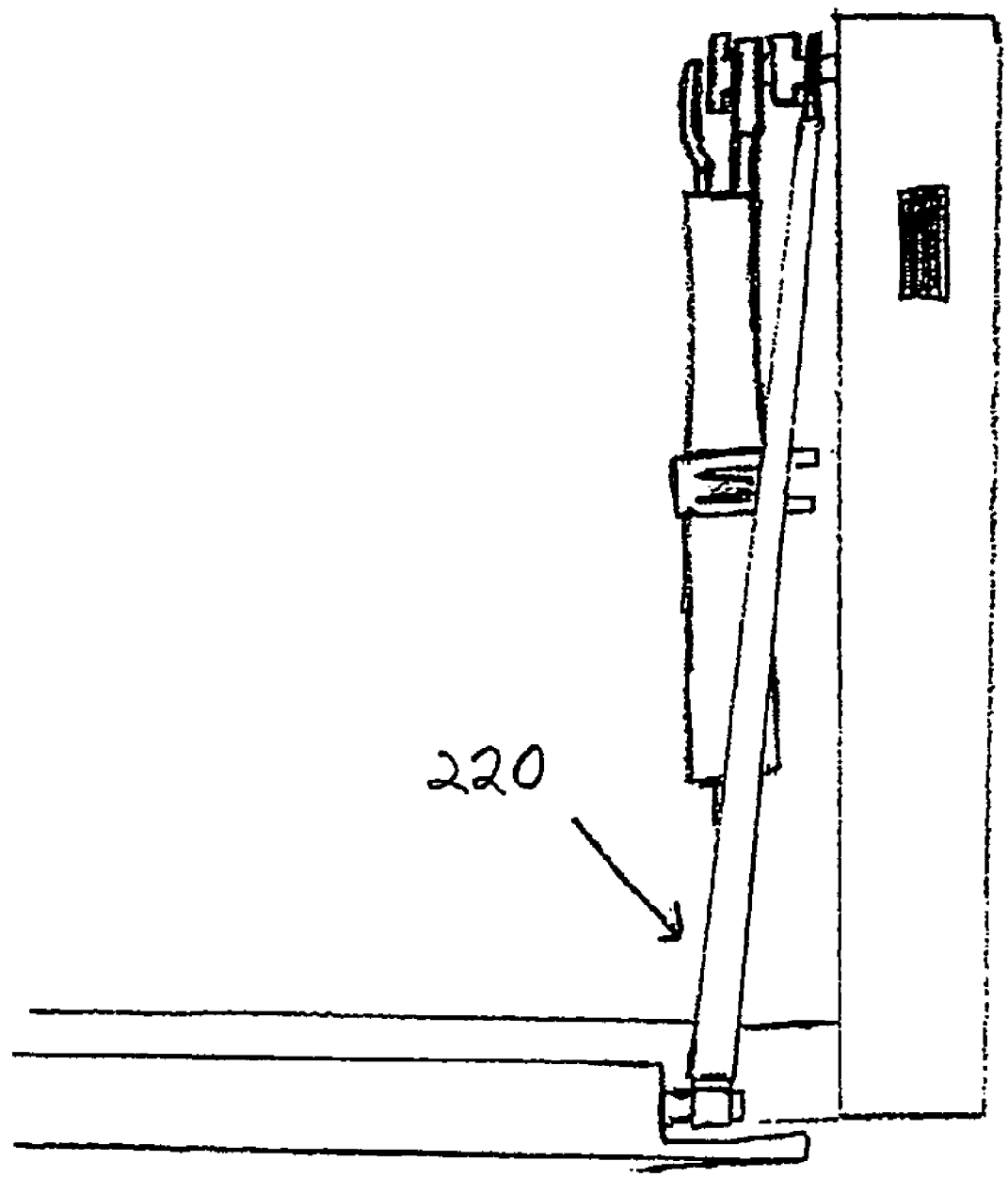
FIG. 8 is a front view of the installed tailgate dampening system of the present invention in a fully-open position.

As shown in FIG. 8, the entire tailgate dampening assembly fits inside the space created between the truck bed and the tailgate when the tailgate is closed. As a result, the invention is hidden from view until the tailgate is opened, leaving the outside appearance of the truck unaltered. Furthermore, because the tailgate remains attached to the truck bed in its original manner, and because the invention does not interfere with the locking mechanism of the tailgate or existing safety cable 220, the safety and structural integrity of the tailgate assembly is unaffected by installation or operation of the invention. The adjustable retention clip 55 is optional as it may be that the existing safety cable 220 naturally falls in a place that does not interfere with the tailgate dampening apparatus.

The tailgate dampening apparatus, in one embodiment, is supplied to users as part of a retrofit kit. The tools necessary for installation, such as a wrench, are supplied with the system and can be easily installed and removed by the user. The retrofit kit includes various nuts, bolts and washers that are used to attach the tailgate dampening apparatus to the truck bed and tailgate. These nuts, bolts and washers can be of varying sizes and can be made of various materials. Embodiments of these nuts and bolts are described below. Additionally, the entire apparatus may be treated with corrosion and/or scratch-resistant coating.

Figure 9A:
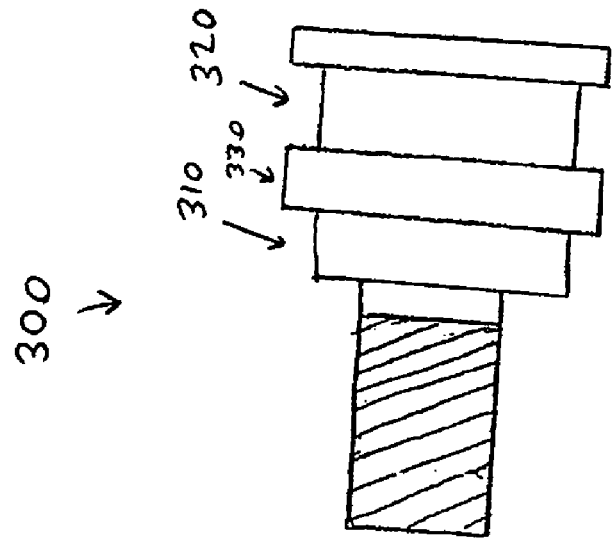
FIG. 9 and FIG. 9A are isometric and side views, respectively, of the bolt used to attach the tailgate dampening system to the truck bed.
Figure 9:
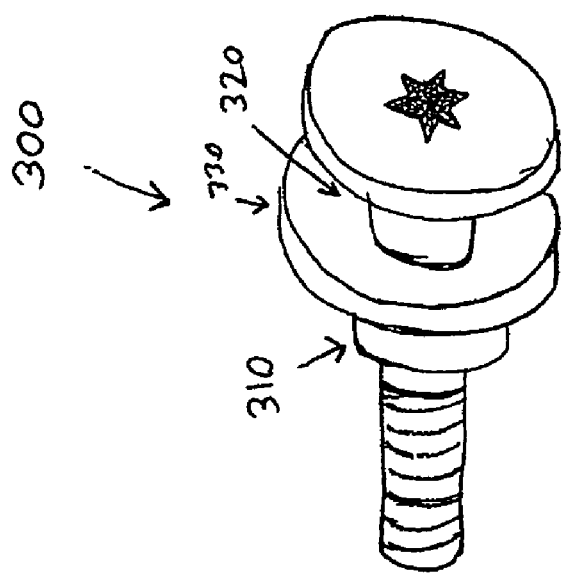

As shown in FIGS. 9 and 9A, one embodiment of a bolt 300 is adapted to accept the quick-release fitting of bed attachment 40. The bolt 300 is screwed into the bed of the truck in place of the existing safety cable 220 attachment bolt. Safety cable 220 engages safety cable attachment point 310 on bolt 300, while the quick-release fitting of bed attachment 40 engages quick-release attachment point 320. Spacer section 330 keeps safety cable 220 and bed attachment 40 from interfering with each other when installed.

Figure 10A:
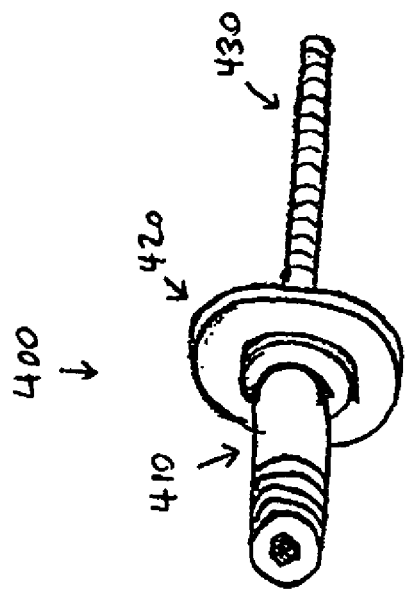
FIG. 10 and FIG. 10A are side and isometric views, respectively, of the bolt used to attach the tailgate dampening system to the tailgate.
Figure 10:
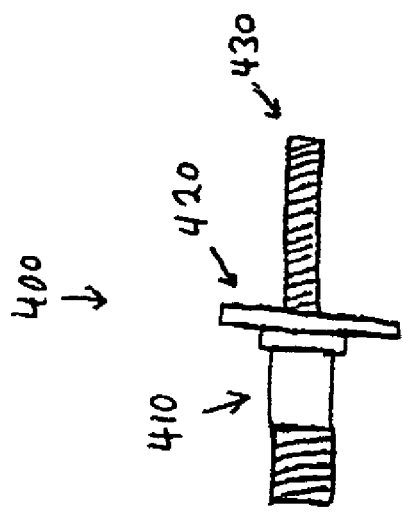

As shown in FIGS. 10 and 10A, tailgate attachment bolt 400 includes axle 410 which allows tailgate attachment 30 to swivel freely while it is secured to axle 410 by a nut. Spacer 420 prevents the motion of tailgate attachment 30 and rod 50 from damaging the tailgate, while screw portion 430 is used to secured tailgate attachment bolt 400 to the tailgate of the truck.

Figure 11A:
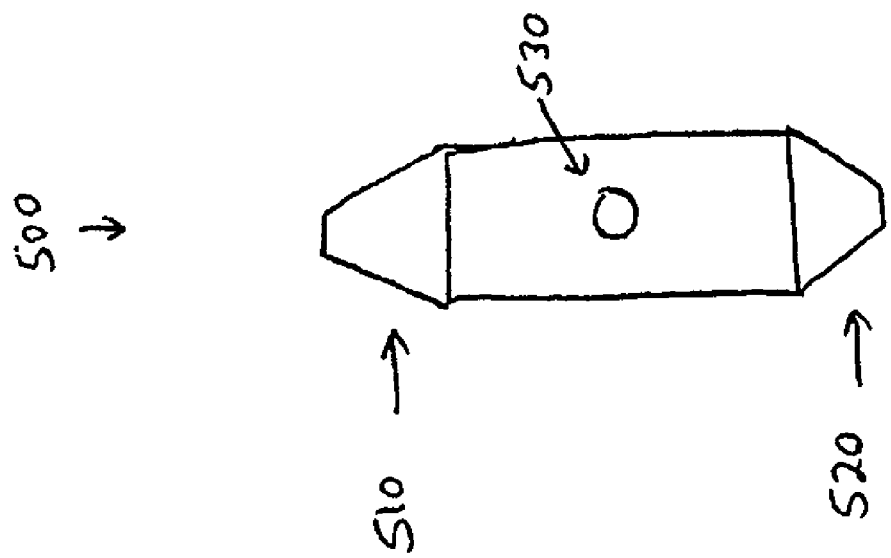
FIG. 11 and FIG. 11A are side and top views, respectively, of the nut used to attach the bolt of FIG. 10 and FIG. 10A to the tailgate.
Figure 11:
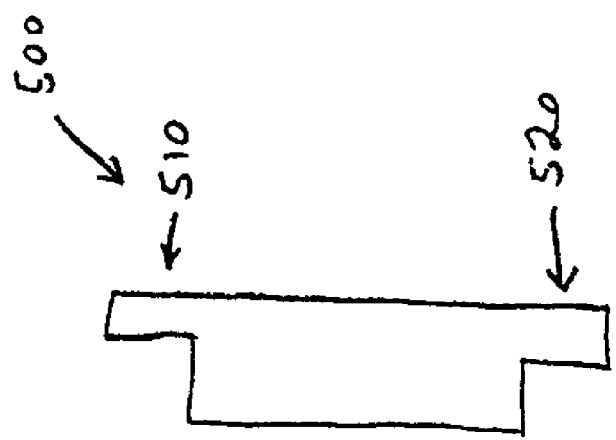

As shown in FIGS. 11 and 11A, tailgate attachment nut 500 includes wings 510 and 520 which allow tailgate attachment nut 500 to be placed horizontally in a slot in the tailgate of the truck of the same width, and then rotated 90 degrees to lock it into place. Tailgate attachment nut 500 also includes grooved hole 530 to receive screw portion 430 of tailgate attachment bolt 400 and secure it into place.

Figure 12:
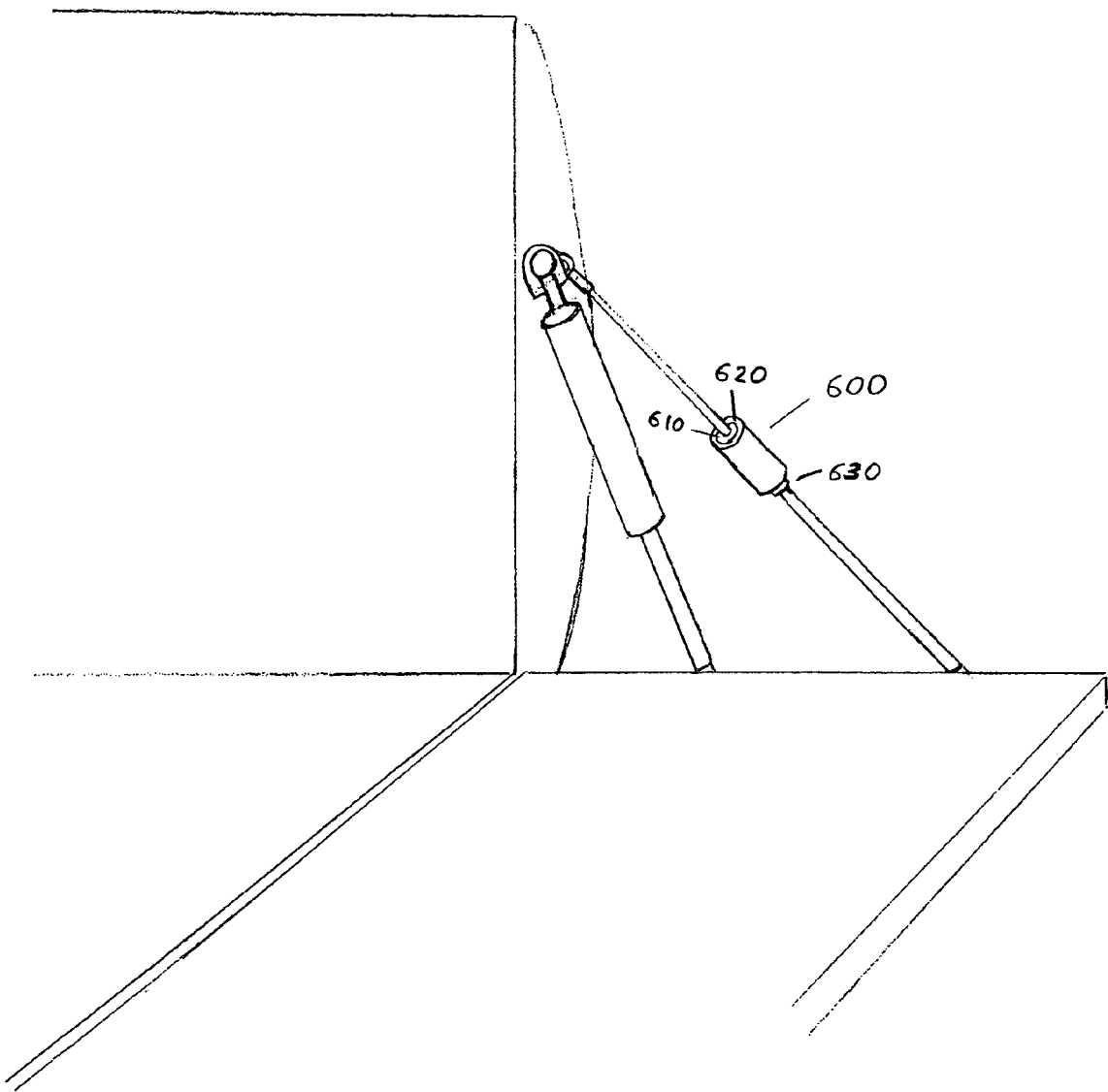
FIG. 12 is a side view of an alternate embodiment of the installed tailgate dampening system of the present invention in a partially-open position incorporating a foam spacer instead of a retaining clip.

FIG. 12 shows another embodiment of the invention, in which the function of adjustable retention clip 55 is instead performed by foam spacer 600. Foam spacer 600 is composed of a section of closed cell foam 610 wrapped around the vehicle's existing tailgate safety cable, further wrapped in heat shrink tubing 620, while cable tie 630 is wrapped around the tailgate safety cable to form the bottom of foam spacer 600. Foam spacer 600 prevents the dampening system and the existing tailgate safety cable from interfering with one another.

Figure 13A:
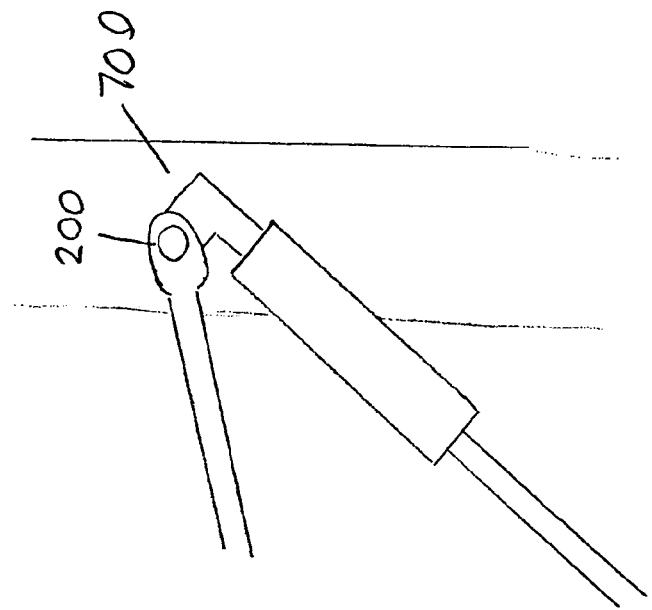
FIG. 13 and FIG. 13 A are isolated and installed views, respectively of an alternate embodiment of the present invention incorporating a tube blade fitting bed attachment instead of a quick-release bed attachment.
Figure 13:
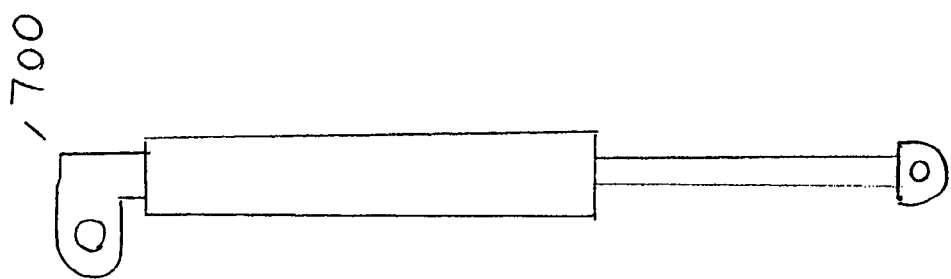

FIG. 13 shows another embodiment, wherein the quick-release fitting of bed attachment 40 is replaced with tube blade fitting 700. Blade fitting 700 is similarly attached to existing safety cable attachment point 200 in the truck bed, as shown in FIG. 13A.

Figure 14:
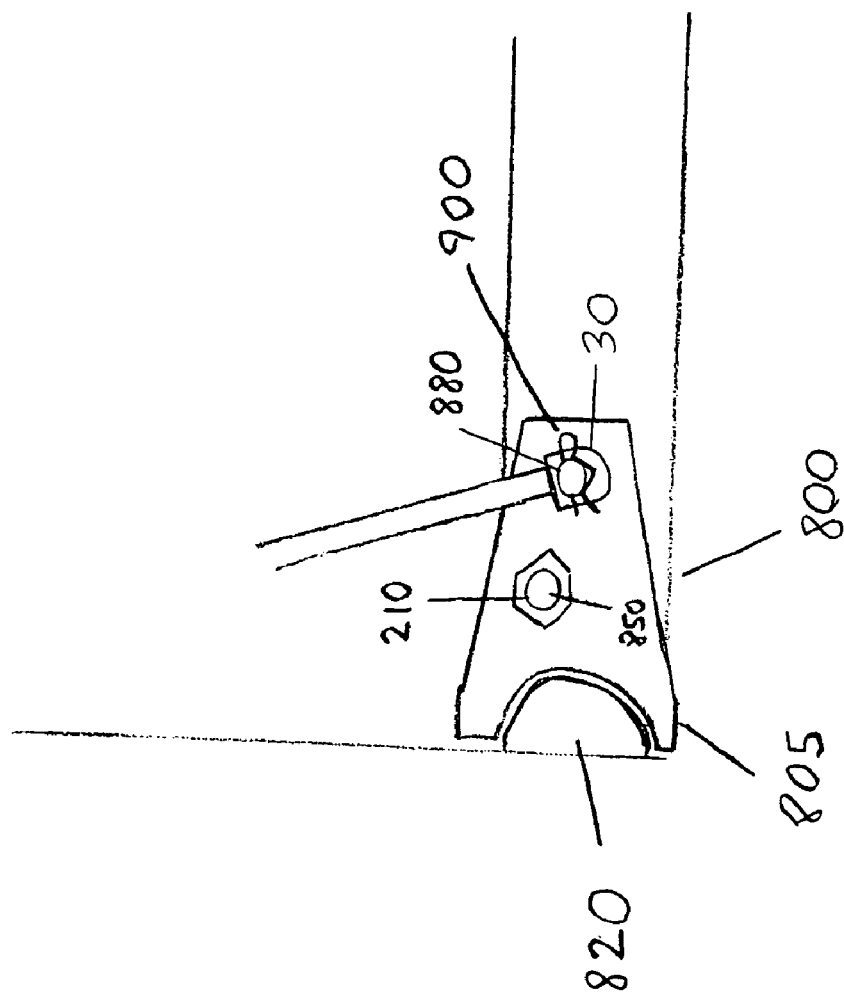
FIG. 14 is a side view of an alternate embodiment of the installed tailgate dampening system of the present invention in the fully-open position incorporating the bracket assembly attachment to the truck's tailgate.

As shown in FIG. 14, in another embodiment, tailgate attachment 30 may be attached to the tailgate of the truck through the use of a bracket assembly 800, which consists of a bracket 805, a tailgate bolt 850, and a bracket stud 880. Bracket 805 is attached to tailgate attachment point 210 on the tailgate of the truck by tailgate bolt 850, and is adapted to engage tailgate hinge 820. Bracket stud 880 is then attached to bracket 805, and tailgate attachment 30 is placed over bracket stud 880. Tailgate attachment 30 is held in place over bracket stud 880 by spring-type cotter pin 900.

Figures 15, 15A:
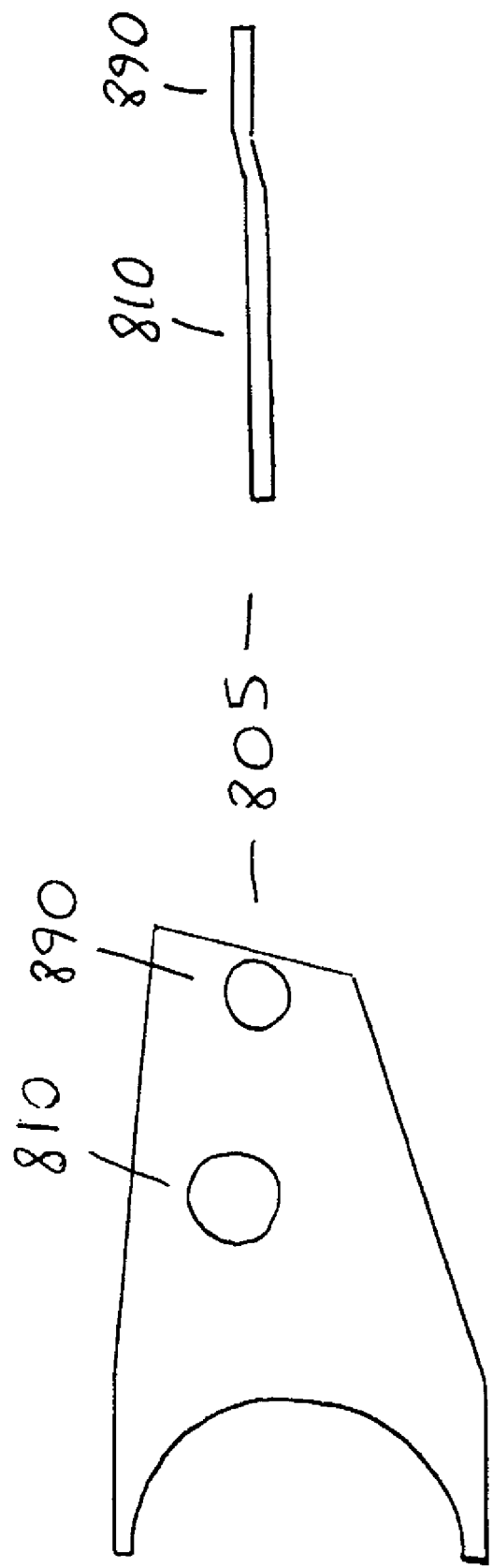
FIG. 15 and FIG. 15A are front and top-down views, respectively, of the bracket of an alternate embodiment used to attach the damper to the tailgate.

With reference to FIG. 15 and FIG. 15A, bracket 805, in one embodiment, is adapted to engage the truck's tailgate hinge 820. This prevents bracket 805 from rotating, and possibly loosening tailgate bolt 850, which is installed through tailgate bolt opening 810. Bracket stud 880 is screwed into bracket stud opening 890 to provide an attachment point for tailgate attachment 30.

Figure 16:
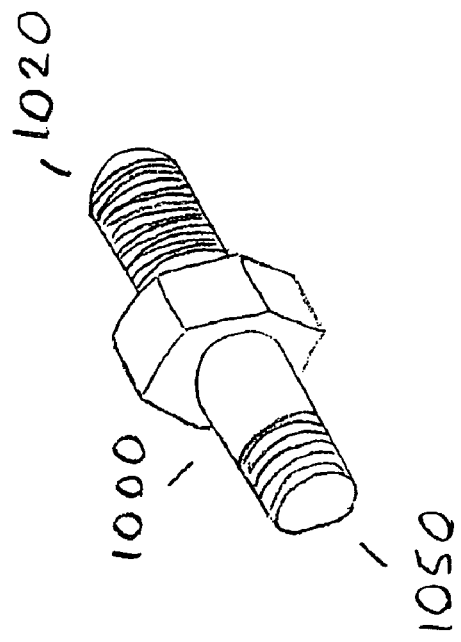
Figure 16:
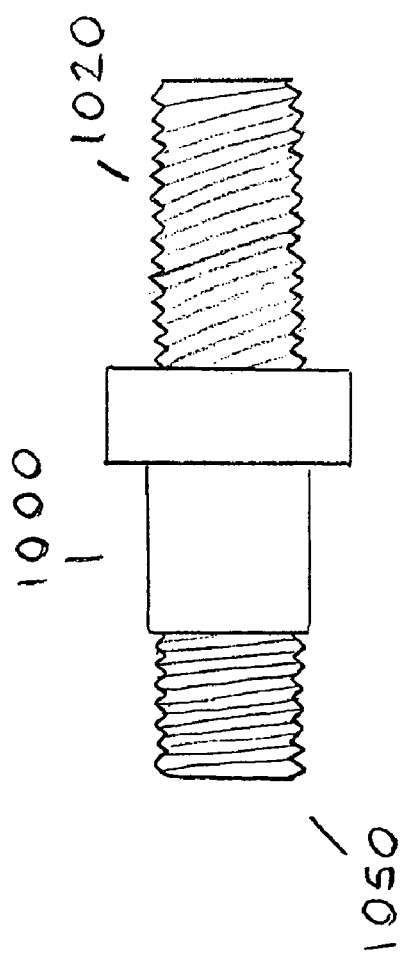

With reference to FIG. 16 and FIG. 16A, tailgate bolt 850 is installed in tailgate attachment point 210 by inserting screw portion 1020. Tailgate bolt opening 810 of bracket 805 is placed over tailgate bolt 850 and rests on axle 1000. Bracket 805 is secured by a nut screwed onto screw portion 1050 of tailgate bolt 850.

With reference to FIGS. 17 and 17A, bracket stud 880 contains screw portion 1100, which is screwed into bracket stud opening 890 in bracket 805. Bracket 805 rests on axle 1150. Tailgate attachment 30 is placed over bracket stud head 1200. Bracket stud head 1200 includes an opening 1250, which allows insertion of spring-type cotter pin 900 to secure tailgate attachment 30 to bracket stud 880.

The foregoing merely illustrates the principles of the invention. Various modifications and alterations to the described embodiments will be apparent to those skilled in the art in view of the teachings herein. It will thus be appreciated that those skilled in the art will be able to devise numerous techniques which, although not explicitly described herein, embody the principles of the invention and are thus within the spirit and scope of the invention.

The invention claimed is:

1. An apparatus for controlling the downward motion of a tailgate attached to a truck bed, comprising:
    an oil-filled damper comprising a piston within a housing having two ends attached to a rod at one end, the rod having a distal end, the damper exerting a damping force during opening of the tailgate;
    a truck bed attachment at the distal end of said rod; and
    a tailgate attachment near the second end of said damper;
    wherein said truck bed attachment is securable to a truck bed attachment point located on said truck bed, and said tailgate attachment is securable to a tailgate attachment point located on said tailgate, and
    wherein an adjustable retention clip is attached to the housing to properly align an existing cable of said tailgate.

2. The apparatus of claim 1 further comprising a damper that exerts a damping force during opening of the tailgate and exerts a minimal force during closing of the tailgate.

3. The apparatus of claim 1 further comprising a corrosion and scratch-resistant coating.

4. The apparatus of claim 1 wherein said truck bed attachment point is a quick-disconnect fitting.

5. The apparatus of claim 1, wherein said truck bed attachment point is a pre-existing hole in the truck bed.

6. The apparatus of claim 1, wherein said tailgate attachment point is a pre-existing hole in the tailgate.

7. An apparatus for controlling the downward motion of a tailgate attached to a truck bed, comprising:
    an oil-filled damper comprising a piston within a housing having two ends attached to a rod at one end, the rod having a distal end, the damper exerting a damping force during opening of the tailgate;
    a truck bed attachment at the distal end of said rod; and
    a tailgate attachment near the second end of said damper;
    wherein said truck bed attachment is securable to a truck bed attachment point located on said truck bed, and said tailgate attachment is securable to a tailgate attachment point located on said tailgate, and
    wherein a foam spacer is placed around an existing cable of said tailgate so as to properly align said cable.

8. The apparatus of claim 7, further comprising a damper that exerts a damping force during opening of the tailgate and exerts a minimal force during closing of the tailgate.

9. The apparatus of claim 7, further comprising a corrosion and scratch-resistant coating.

10. The apparatus of claim 7, wherein said truck bed attachment point is a quick-disconnect fitting.

11. The apparatus of claim 7, wherein said truck bed attachment point is a pre-existing hole in the truck bed.

12. The apparatus of claim 7, wherein said tailgate attachment point is a pre-existing hole in the tailgate.

13. An apparatus for controlling the downward motion of a tailgate attached to a truck bed, comprising:
    an oil-filled damper comprising a piston within a housing having two ends attached to a rod at one end, the rod having a distal end, the damper exerting a damping force during opening of the tailgate;
    a truck bed attachment at the distal end of said rod; and
    a tailgate attachment near the second end of said damper;
    wherein said truck bed attachment is securable to a truck bed attachment point located on said truck bed, and said tailgate attachment is securable to a tailgate attachment point located on said tailgate, and
    wherein said truck bed attachment point is a blade fitting.

14. The apparatus of claim 13, further comprising a damper that exerts a damping force during opening of the tailgate and exerts a minimal force during closing of the tailgate.

15. The apparatus of claim 13, further comprising a corrosion and scratch-resistant coating.

16. The apparatus of claim 13, wherein said truck bed attachment point is a quick-disconnect fitting.

17. The apparatus of claim 13, wherein said truck bed attachment point is a pre-existing hole in the truck bed.

18. The apparatus of claim 13, wherein said tailgate attachment point is a pre-existing hole in the tailgate.

19. An apparatus for controlling the downward motion of a tailgate attached to a truck bed, comprising:
    an oil-filled damper comprising a piston within a housing having two ends attached to a rod at one end, the rod having a distal end, the damper exerting a damping force during opening of the tailgate;
    a truck bed attachment at the distal end of said rod; and
    a tailgate attachment near the second end of said damper;
    wherein said truck bed attachment is securable to a truck bed attachment point located on said truck bed, and said tailgate attachment is securable to a tailgate attachment point located on said tailgate, and wherein said tailgate attachment point is secured to said tailgate through the use of a bracket assembly.

20. The apparatus of claim 19 wherein said bracket assembly consists of a bracket, a tailgate attachment bolt securing said bracket to said tailgate, and a bracket stud secured to said bracket providing an attachment point for said tailgate attachment point.

21. The apparatus of claim 19 wherein said tailgate attachment point is secured to said bracket assembly through the use of a cotter pin.

22. The apparatus of claim 19, further comprising a damper that exerts a damping force during opening of the tailgate and exerts a minimal force during closing of the tailgate.

23. The apparatus of claim 19, further comprising a corrosion and scratch-resistant coating.

24. The apparatus of claim 19, wherein said truck bed attachment point is a quick-disconnect fitting.

25. The apparatus of claim 19, wherein said truck bed attachment point is a pre-existing hole in the truck bed.

26. The apparatus of claim 19, wherein said tailgate attachment point is a pre-existing hole in the tailgate.

27. An apparatus for controlling the downward motion of a tailgate attached to a truck bed, comprising:
   an oil-filled damper comprising a piston within a housing having two ends attached to a rod at one end, the rod having a distal end, the damper exerting a damping force during opening of the tailgate;
   a truck bed attachment at the distal end of said rod; and
   a tailgate attachment near the second end of said damper;
   wherein said truck bed attachment is securable to a truck bed attachment point located on said truck bed, and said tailgate attachment is securable to a tailgate attachment point located on said tailgate, and
   wherein said damper comprises:
   a piston having a bypass groove, said bypass groove having a flow area allowing fluid flow from one side of the piston to the other;
   a top washer placed on top of said piston, said top washer arranged so as to partially cover the flow area of the bypass groove;
   a bottom washer placed underneath said piston;
   a sealing ring placed around said piston to prevent the flow of hydraulic oil around the piston; and
   a bolt placed axially through said washers and said piston.

28. The apparatus of claim 27, further comprising a washer that deflects under excessive hydraulic pressure, thus increasing said flow area.

29. The apparatus of claim 27, further comprising a damper that exerts a damping force during opening of the tailgate and exerts a minimal force during closing of the tailgate.

30. The apparatus of claim 27, further comprising a corrosion and scratch-resistant coating.

31. The apparatus of claim 27, wherein said truck bed attachment point is a quick-disconnect fitting.

32. The apparatus of claim 27, wherein said truck bed attachment point is a pre-existing hole in the truck bed.

33. The apparatus of claim 27, wherein said tailgate attachment point is a pre-existing hole in the tailgate.

* * * * *